United States Patent [19]

Stratton

[11] 4,258,546
[45] Mar. 31, 1981

[54] PROPULSION SYSTEM

[75] Inventor: Harold S. Stratton, Woodland Hills, Calif.

[73] Assignee: Rockwell International Corporation, El Segundo, Calif.

[21] Appl. No.: 3,324

[22] Filed: Jan. 15, 1979

[51] Int. Cl.³ .............................................. F02K 9/02
[52] U.S. Cl. .................................... 60/259; 244/3.23
[58] Field of Search ................ 60/201, 259, 247–249; 244/169, 3.23

[56] References Cited

U.S. PATENT DOCUMENTS

| 2,410,538 | 11/1946 | Walton | 60/201 |
| 2,918,791 | 12/1959 | Greiner | 60/259 |
| 3,011,312 | 12/1961 | Black | 60/259 |
| 3,088,406 | 5/1963 | Horner | 60/247 |
| 3,479,818 | 11/1969 | Strobl | 60/247 |

OTHER PUBLICATIONS

Traynelis et al., "Study of Integrated Control Systems," ASD Tech. Rpt. pp. 61-327, vol. 1, Nov., 1961, Sect. 2.2.

Primary Examiner—Robert E. Garrett
Attorney, Agent, or Firm—H. F. Hamann; Robert M. Sperry

[57] ABSTRACT

A liquid rocket propulsion system utilizing vehicle spin forces and/or propellant tank pressure to charge a specific amount of propellant through a differential area piston to create high chamber pressure.

13 Claims, 2 Drawing Figures

PROPULSION SYSTEM

BACKGROUND OF THE INVENTION

1. Field of the Invention

This invention relates to liquid rocket propulsion systems and is particularly directed to liquid rocket propulsion systems for spin-stabilized and other small vehicles.

2. Description of the Prior Art

Liquid or fluid-fueled rocket engines have been known for many years and have been the primary propulsion system for virtually all of the world's exploration of space. In fact, in any rocket program which requires high performance and low weight, liquid or fluid-fueled rockets have been preferred over solid rockets. Furthermore, liquid rockets may be started and stopped, substantially as desired, whereas solid rockets are usually one-shot devices. On the other hand, liquid rockets are, inherently, much more bulky than solid rockets. Consequently, where size is an important factor, solid rockets are often preferred. For military purposes, size is often a major consideration since problems of deployment and concealment are directly related to size. Moreover, for those rockets which are intended for missions that are conducted primarily within the earth's atmosphere, increases in size usually cause increases in frontal area and, hence, increase drag and decrease performance. Therefore, solid rockets have usually been preferred for military purposes.

An additional disadvantage of liquid or fluid-fueled rockets has been complexity. Storage tanks are required for the fuel and some means, such as pressurization, a positive expulsion mechanism or the like, has been needed to deliver the fuel from the storage tanks to the thrust chamber. Frequently, high performance pumps, sophisticated valves and elaborate plumbing are required for such fuel delivery systems. Obviously, this adds to the weight and bulk of the liquid rocket propulsion system.

BRIEF SUMMARY AND OBJECTS OF THE INVENTION

These disadvantages of the prior art are overcome with the present invention and a liquid rocket propulsion system is provided which is simple, compact and light in weight. Moreover, the propulsion system of the present invention is useful with either monopropellant of bipropellant fuels. The propulsion system of the present invention is uniquely valuable in spin-stabilized vehicles, since it utilizes the spin forces to deliver the fuel from the storage tanks to the thrust chamber, regardless of vehicle attitude or "g" forces.

The advantages of the present invention are preferably attained by providing a liquid or fluid-fueled rocket engine having a thrust chamber, a differential area piston dividing said thrust chamber into a charging chamber and a combustion chamber, fuel storage means, means utilizing the spin forces of the vehicle or a propellant expulsion system for delivering fuel from said fuel storage means to said charging chamber, means for delivering fuel at a predetermined rate from said charging chamber to said combustion chamber, and means for initiating movement of said piston to drive fuel from said charging chamber to said combustion chamber.

Accordingly, it is an object of the present invention to provide an improved liquid or fluid-fueled rocket propulsion system.

Another object of the present invention is to provide a liquid or fluid-fueled rocket propulsion system which is simple, compact and light in weight.

A further object of the present invention is to provide a liquid or fluid-fueled rocket propulsion system including means utilizing the spin forces of the vehicle for delivering fuel to the thrust chamber of the rocket.

A specific object of the present invention is to provide a liquid or fluid-fueled rocket propulsion system comprising a thrust chamber, a differential area piston dividing said thrust chamber into a charging chamber and a combustion chamber, fuel storage means, means utilizing the spin forces of the vehicle or a propellant expulsion system for delivering fuel from said fuel storage means to said charging chamber, means for delivering fuel at a predetermined rate from said charging chamber to said combustion chamber, and means for initiating movement of said piston to drive fuel from said charging chamber to said combustion chamber.

These and other objects and features of the present invention will be apparent from the following detailed description, taken with reference to the accompanying drawing.

DETAILED DESCRIPTION OF THE INVENTION

Figure 1:
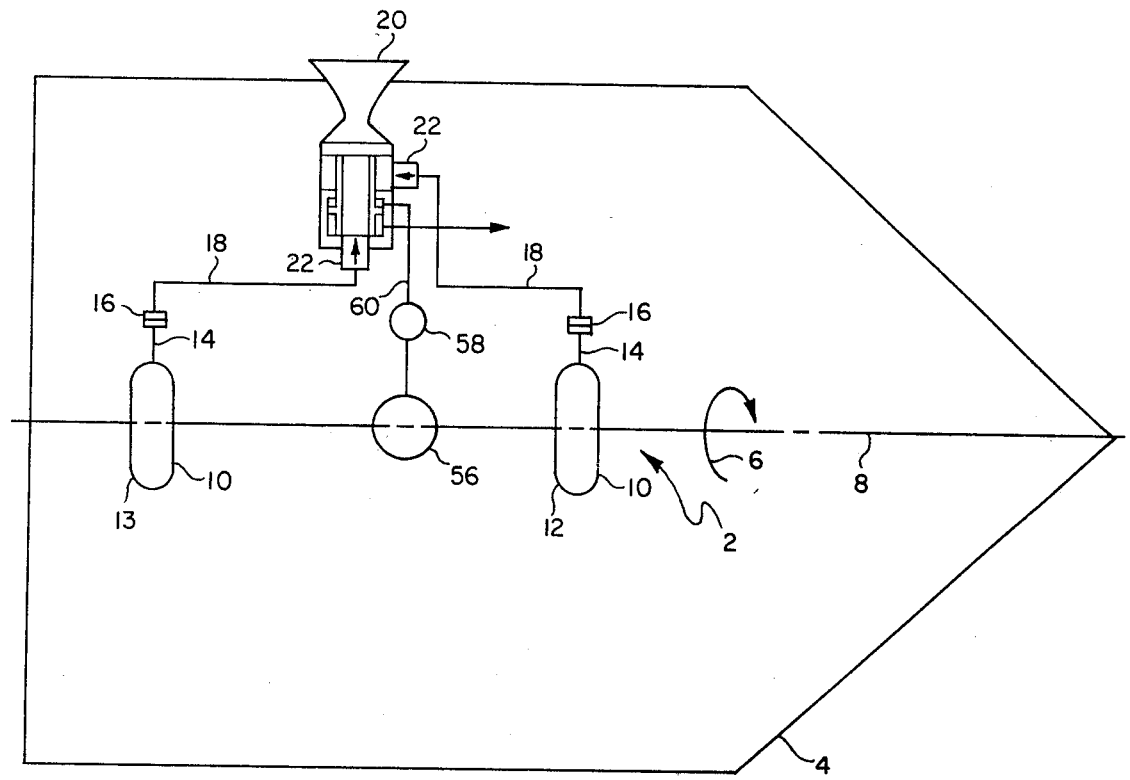
FIG. 1 is a diagrammatic representation of a rocket propulsion system embodying the present invention.

In that form of the present invention chosen for purposes of illustration, FIG. 1 shows a rocket propulsion system, indicated generally at 2, for a vehicle, indicated generally at 4. The vehicle 4 may be spin-stabilized by rotation, represented by arrow 6, about the longitudinal axis of the vehicle 4, indicated by broken line 8. One or more propellant storage tanks 10 are mounted concentric with the vehicle axis 8. As shown, the system is a bipropellant system and, hence, includes an oxidizer tank 12 and a fuel tank 13. In a monopropellant system, only a single tank would be required. The tanks 10 may be substantially any desired configuration, but are designed to have outlet means 14 provided at their circumferential extremity. In this way, the rotation of the vehicle 4 which provides the spin-stabilization will also create centrifugal forces in the propellant which can be utilized to expel the propellant from the tanks 10. The propellant may normally be retained in the tanks 10 by suitable retaining means, such as burst diaphragms 16 until the centrifugal forces in the propellant exceed the limits of the burst diaphragm 16. After release by burst diaphragms 16, or the like, the propellant is delivered by centrifugal force and/or pressure through suitable conduits 18 to a thrust chamber 20. The rate of flow of the propellant to the thrust chamber 20 may be regulated by check valves 22 or the like.

Figure 2:
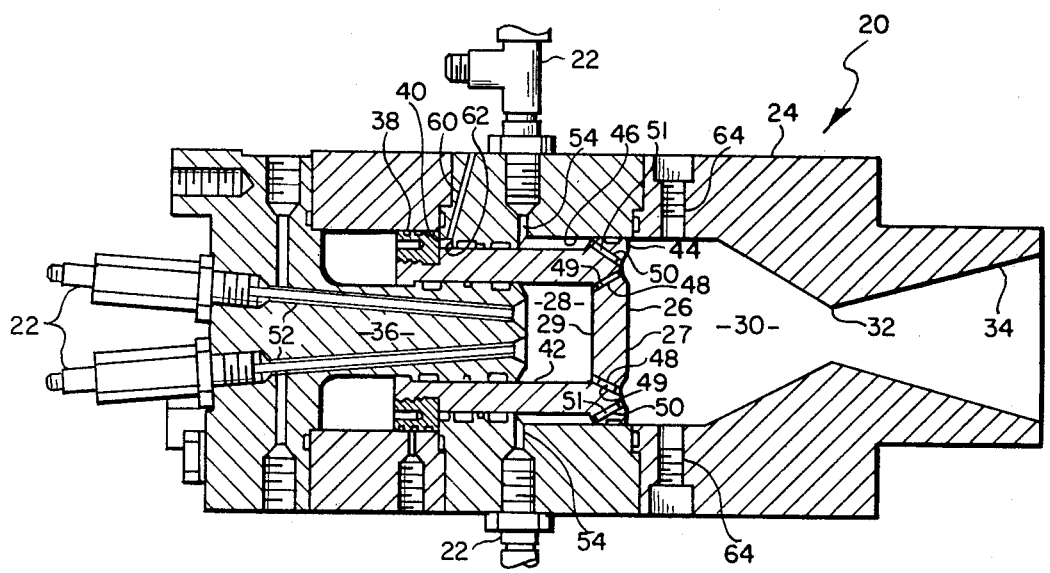
FIG. 2 is a vertical section through the thrust chamber of the propulsion system of FIG. 1.

The thrust chamber 20 is best seen in FIG. 2 and comprises a hollow body 24 having an interior which is divided by a differential area piston 26 into a charging chamber 28 and a combustion chamber 30. The surface 27 of piston 26 facing combustion chamber 30 is approximately twice the surface 29 of piston 26 facing charging chamber 28. The combustion chamber 30 communicates with the exterior via nozzle 34 and throat 32. The piston 26 is generally cup-shaped and is slidably moveable along a plunger 36.

At its rearward extremity, the piston 26 is provided with a peripheral flange 38, which projects outwardly from the rear end of piston 26 and engages an abutment 40 to limit the forward movement of the piston 26. As shown, the sidewall 42 of the piston 26 is integral and the piston 26 is provided with a peripheral lip 44, which defines an annular chamber 46 between the interior wall of the thrust chamber 20 and the exterior wall of piston 26. Passageways 48 and 50 extend through the face of the piston 26 and suitable valve means 49 and 51 are mounted therein to permit regulated flow of fluid therethrough. Passageways 48 communicate the annular chamber 28 with the combustion chamber 30, while passageways 50 communicate the charging chamber 46 with the combustion chamber 30. If desired, suitable means, such as check valves may be provided in the passageways 48 and 50 to further regulate fluid flow therethrough. For a bipropellant system, passageways 52 are provided to deliver oxidizer through plunger 36 to the charging chamber 28, while passageways 54 are provided to deliver fuel into the annular chamber 46.

In order to initiate operation of the propulsion system of the present invention, a storage tank 56 is provided as seen in FIG. 1, and is filled with pressurized gas. The storage tank 56 is connected through a suitable electrically actuable valve 58 and conduit 60 to an annular recess 62 formed in the face of abutment 40.

In operation, rotation of the vehicle 4 by the spin-stabilization system creates centrifugal force in the oxidizer and fuel fluids contained in tanks 12 and 13, respectively. The centrifugal force drives these fluids through the retaining means 16, conduits 18 and check valves 22. As shown in FIG. 2, the oxidizer is delivered through conduits 52 in plunger 36 to the charging chamber 28 within piston 26, while the fuel is delivered through conduits 54 to the annular chamber 46. Since the fuel and oxidizer fluids are under pressure, or centrifugal force, they serve to drive piston 26 forwardly until flange 38 engages abutment 40. When the operator desires to fire the propulsion system, he actuates the electrically operated valve 58, which allows pressurized gas from tank 56 to be delivered through conduit 60 to the recess 62 in abutment 40. The gas from tank 56 must have sufficient pressure to initiate rearward movement of piston 26. As piston 26 moves rearward, the fluid oxidizer in charging chamber 28 begins to flow through passageways 48 into the combustion chamber 30. At the same time, the fluid in the annular chamber 46, begins to flow through passageways 50 into the combustion chamber 30. Preferably, the oxidizer and fuel are hypergolic and will ignite spontaneously upon ejection into the combustion chamber 30. The burning of the oxidizer and fuel creates forces within the combustion chamber 30 which accelerate the rearward movement of piston 26 and, hence, continue the flow of oxidizer and fuel, until piston 26 reaches the rearward limit of its movement. When this limit is reached, the fuel and oxidizer will no longer be forced to flow through piston 26 into the combustion chamber 30. As a result, the combustion will cease; whereupon centrifugal force will cause the oxidizer and fuel to again be delivered from the storage tanks 10 to the charging chamber 28 and annular chamber 46 to drive piston 26 forwardly in preparation for a subsequent firing. If the fuel and oxidizer are not hypergolic, suitable ignition means may be provided, as indicated at 64.

It will be seen that the rate of flow of fluid from the storage tanks 10 to the charging chamber 28 and annular chamber 46 will be a function of the pressure in tanks 10, the centrifugal force or pressure developed in the fluids, by rotation of the vehicle 4 by the spin-stabilization system and the action of the check valves 22. The firing pulse shape produced by the thrust chamber 20 will be a function of the diameter of nozzle 32, the differential area of faces 27 and 29 of the piston 26 and the diameters of the passageways 48 and 50. As seen in FIG. 1, the thrust chamber 20 is oriented to fire radially of the vehicle 4. However, it will be obvious to those skilled in the art that the thrust chamber 20 may be oriented substantially as desired without effecting the operation of the propulsion system of the present invention. The propulsion system of the present invention has been described as utilizing the centrifugal forces developed by the spin-stabilization system to deliver oxidizer and fuel from the storage tanks to the thrust chamber. This makes it possible to greatly reduce the weight, complexity and cost of a liquid or fluid fueled rocket propulsion system, while retaining the performance and multiple-firing capability of such systems. On the other hand, it will be apparent to those skilled in the art that pressure-powered fuel delivery systems will be advantageous in non-rotating vehicles.

In addition, numerous other variations and modifications may obviously be made without departing from the present invention. Accordingly, it should be clearly understood that the forms of the present invention described above and shown in the accompanying drawing are illustrative only and are not intended to limit the scope of the present invention.

What is claimed is:

1. A fluid-fueled rocket propulsion system for aerospace vehicles comprising:
   a thrust chamber,
   a differential area piston slideable within said thrust chamber dividing said thrust chamber into a charging chamber and a combustion chamber,
   propellant storage means,
   delivery means for delivering propellant from said storage means to said charging chamber,
   metering means for delivering propellant at a predetermined flow rate from said charging chamber to said combustion chamber and,
   means for initiating movement of said piston to drive propellant from said charging chamber to said combustion chamber.

2. The propulsion system of claim 1 wherein:
   said vehicle is spin-stabilized, and
   said storage means are designed and situated so as to enhance expulsion of fluid therefrom by centrifugal force.

3. The propulsion system of claim 2 wherein:
   said storage means is situated coaxially with the spin axis of said vehicle.

4. The propulsion system of claim 1 wherein:
   the surface area of said piston facing said combustion chamber is approximately twice the area of said piston facing said charging chamber.

5. The propulsion system of claim 1 wherein:
   said delivery system includes means for positively expelling fluid from said storage means.

6. The propulsion system of claim 1 wherein:

said thrust chamber is formed with an interior chamber and having a throat and nozzle communicating said interior chamber with the exterior at one end of said thrust chamber.

7. The propulsion system of claim 6 wherein:
said piston is generally cup-shaped and is formed with an outwardly projecting flange adjacent the rear end thereof, and an abutment projecting inwardly from the wall of said interior chamber and engageable by said flange to limit the forward movement of said piston.

8. The propulsion system of claim 7 wherein said means for initiating movement of said piston comprises:
a source of pressurized fluid,
an opening formed in the face of said abutment engageable by said flange,
conduit means connected to deliver pressurized fluid from said source to said opening, and
control means actuable to permit said pressurized fluid to flow through said conduit means to initiate rearward movement of said piston.

9. A rocket engine comprising:
a thrust chamber,
a differential area piston slidable within said thrust chamber dividing said thrust chamber into a charging chamber and a combustion chamber;
delivery means for delivering propellant from said charging chamber to said combustion chamber at a predetermined rate; and
means for initiating movement of said piston to drive propellant from said charging chamber to said combustion chamber.

10. The propulsion system of claim 9 wherein the surface area of said piston facing said combustion chamber is approximately twice the area of said piston facing said charging chamber.

11. The propulsion system of claim 9 wherein said thrust chamber is formed with an interior chamber and having a throat and nozzle communicating said interior chamber with the exterior at one end of said thrust chamber.

12. The propulsion system of claim 9 wherein said piston is generally cup-shaped and is formed with an outwardly projecting flange adjacent the rear end thereof, and an abutment projecting inwardly from the wall of said interior chamber and engageable by said flange to limit the forward movement of said piston.

13. The propulsion system of claim 9 wherein said means for initiating movement of said piston comprises:
a source of pressurized fluid;
an opening formed in the face of said abutment engageable by said flange;
conduit means connected to deliver pressurized fluid from said source to said opening; and
control means actuable to permit said pressurized fluid to flow through said conduit means to initiate rearward movement of said piston.

* * * * *

UNITED STATES PATENT AND TRADEMARK OFFICE
CERTIFICATE OF CORRECTION

PATENT NO. : 4,258,546

DATED : March 31, 1981

INVENTOR(S) : Harold S. Stratton

It is certified that error appears in the above-identified patent and that said Letters Patent are hereby corrected as shown below:

Column 3, line 17, delete "annular" and insert --charging--;
line 19, delete "charging" and insert --annular--.

Signed and Sealed this

Fourteenth Day of July 1981

[SEAL]

Attest:

Attesting Officer

GERALD J. MOSSINGHOFF

Commissioner of Patents and Trademarks